US008233873B2

(12) United States Patent
Principe et al.

(10) Patent No.: US 8,233,873 B2
(45) Date of Patent: Jul. 31, 2012

(54) DEVICE AND METHODS FOR ENHANCED MATCHED FILTERING BASED ON CORRENTROPY

(75) Inventors: Jose C. Principe, Gainesville, FL (US); Rati Agrawal, Dallas, TX (US); Puskal P. Pokharel, Bloomington, MN (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1027 days.

(21) Appl. No.: 12/065,588

(22) PCT Filed: Aug. 29, 2006

(86) PCT No.: PCT/US2006/033953
§ 371 (c)(1), (2), (4) Date: Jul. 7, 2008

(87) PCT Pub. No.: WO2007/027839
PCT Pub. Date: Mar. 8, 2007

(65) Prior Publication Data
US 2009/0203343 A1 Aug. 13, 2009

Related U.S. Application Data

(60) Provisional application No. 60/713,802, filed on Sep. 1, 2005.

(51) Int. Cl.
*H04B 1/10* (2006.01)
(52) U.S. Cl. ........ 455/307; 455/418; 455/306; 375/350; 375/147
(58) Field of Classification Search .................. 455/424, 455/425, 456.5, 456.6, 561, 550.1, 575.1, 455/418, 307, 306, 154.1; 375/147, 234, 375/265, 242, 346, 350, 143, 152, 343; 706/16, 706/20, 48
See application file for complete search history.

(56) References Cited

U.S. PATENT DOCUMENTS

| | | | | | |
|---|---|---|---|---|---|
| 5,943,661 | A | * | 8/1999 | Katz | 706/16 |
| 5,983,254 | A | * | 11/1999 | Azadet | 708/300 |
| 6,118,832 | A | * | 9/2000 | Mayrargue et al. | 375/346 |
| 6,185,716 | B1 | * | 2/2001 | Riggle | 714/769 |
| 6,600,794 | B1 | * | 7/2003 | Agarossi et al. | 375/341 |

(Continued)

OTHER PUBLICATIONS

Casasent, et al., "Advanced Distortion-Invariant Minimum Average Correlation Energy (MACE) Filters," Applied Optics, Mar. 10, 1992, pp. 1109-1116, vol. 31, No. 8, Optical Society of America, Washington, D.C., USA.

(Continued)

*Primary Examiner* — Duc Nguyen
*Assistant Examiner* — Charles Chow
(74) *Attorney, Agent, or Firm* — Thomas, Kayden, Horstemeyer & Risley, LLP

(57) ABSTRACT

A signal processing device is provided, the device having a signal input for receiving a signal conveyed over a channel and defining a received signal. The device further includes one or more filters for generating a signal response based upon the received signal. The signal response includes an estimated value of a correntropy statistic. Additionally, the device includes a decision module connected to at least one of the filters for probabilistically deciding whether the received signal contains an information signal component based upon the estimated value of the correntropy statistic. The device further includes a signal output to convey a signal output indicating the received signal corresponds to a known signal template if the decision module decides that the received signal contains the information signal component.

22 Claims, 9 Drawing Sheets

Continuous detection process

U.S. PATENT DOCUMENTS

| | | | | |
|---|---|---|---|---|
| 6,778,618 | B1* | 8/2004 | Celebi | 375/346 |
| 6,868,190 | B1* | 3/2005 | Morton | 382/278 |
| 6,944,245 | B2* | 9/2005 | Stewart et al. | 375/350 |
| 7,020,214 | B2* | 3/2006 | Bickerstaff | 375/265 |
| 7,079,576 | B2* | 7/2006 | Bologna et al. | 375/234 |
| 7,167,849 | B2* | 1/2007 | Graepel et al. | 706/20 |
| 7,251,297 | B2* | 7/2007 | Agazzi | 375/340 |
| 7,295,774 | B2* | 11/2007 | Bulow | 398/25 |
| 7,471,749 | B2* | 12/2008 | Stewart et al. | 375/346 |
| 7,711,042 | B2* | 5/2010 | Kajiwara | 375/232 |
| 2004/0071196 | A1* | 4/2004 | Marsden et al. | 375/147 |
| 2005/0041746 | A1* | 2/2005 | Rosen et al. | 375/242 |
| 2005/0058302 | A1* | 3/2005 | Dance et al. | 381/94.7 |

OTHER PUBLICATIONS

Erdogmus, et al., "A Mutual Information Extension to the Matched Filter," Signal Processing, May 2005, pp. 927-935, vol. 85, No. 5, CSC Journals, Kuala Lumpur, Malaysia.

Gandhi, et al., "Neural Networks for Signal Detection in Non-Guassian Noise," IEEE Transactions on Signal Processing, Nov. 1997, pp. 2846-2851, vol. 45, No. 11, IEEE Signal Processing Society, Piscataway, NJ, USA.

Garth, et al., "Detection of Non-Gaussian Signals: A Paradigm for Modern Statistical Signal Processing," Proceedings of the IEEE, Jul. 1994, pp. 1061-1095, vol. 82, No. 7, IEEE, New York, USA.

Mahalanobis, et al., "Minimum Average Correlation Energy Filters," Applied Optics, Sep. 1, 1987, pp. 3633-3640, vol. 26, No. 17, Optical Society of America, Washington, D.C., USA.

Pokharel, et al., "Correntropy Based Matched Filtering," 2005 IEEE Workshop on Machine Learning for Signal Processing, Sep. 28, 2005, pp. 341-346, Mystic, CT, USA.

Ravichandran, et al., "Minimum Noise and Correlation Energy Optical Correlation Filter," Applied Optics, Apr. 10, 1992, pp. 1823-1833, vol. 31, No. 11, Optical Society of America, Washington, D.C., USA.

Santamaria, et al., "Generalized Correlation Function: Definition, Properties and Application to Blind Equalization," IEEE Transactions on Signal Processing, Jun. 2006, pp. 2187-2197, vol. 54, No. 6, IEEE Signal Processing Society, Piscataway, NJ, USA.

International Search Report and Written Opinion for International Application No. PCT/US2006/033953 filed on Aug. 29, 2006.

* cited by examiner

Continuous detection process

DEVICE AND METHODS FOR ENHANCED MATCHED FILTERING BASED ON CORRENTROPY

CROSS-REFERENCE TO RELATED APPLICATIONS

This application is a §371 national stage entry of International Application No. PCT/US2006/033953, filed Aug. 29, 2006, which claims priority to US Provisional Patent Application No. 60/713,802, filed Sept. 1, 2005, both of which are hereby incorporated by reference.

STATEMENT REGARDING FEDERALLY SPONSORED RESEARCH OR DEVELOPMENT

This invention was made with government support under National Science Foundation Grant ECS-0300340. The government has certain rights in the invention.

FIELD OF THE INVENTION

The present invention is related to the field of electronic filters, and more particularly, to filters for statistical signal processing.

BACKGROUND OF THE INVENTION

A fundamental component of many devices that receive or otherwise process transmitted waveforms of a certain, known character is the matched filter. Such devices include communication receivers and radar-based automatic target recognition systems, as well as a host of other communications and signal processing devices. The wide applicability of the matched filter with such devices stems from the matched filter's relative simplicity and its optimal functioning within the context of an environment that can be modeled as a linear Gaussian system.

Few if any other systems characterized as linear perform better than those using the matched filter if the template of the transmitted signal is known. More particularly, a signal template, $s_k$, existing during the time interval $[0, T]$ and corrupted by additive white noise (AWN), $n_k$, having zero mean and variance $\sigma_n^2$, gives rise to the following received signal:

$$r_k = s_k + n_k.$$

The matched filter (MF) is characterized by the following impulse response:

$$h_k = s_{T-k}.$$

The output of the MF, $y_k$, accordingly, is given by the convolution of the impulse response and the received signal:

$$y_k = h_k * r_k = h_k * (s_k + n_k),$$

which, by the properties of convolution, is:

$$y_k = h_k * s_k + h_k * n_k.$$

The filter output, $y_k$, therefore, is seen to be composed of a signal component—the convolution with the original signal, $h_k * s_k$—and a noise component—the convolution with the corrupting noise, $h_k * n_k$. It is known, moreover, that the filter output attains its maximum average value at the time instant, T, since there is a maximum correlation between the MF impulse response and template at the lag T. This, in turn ensures a maximum of the signal-to-noise (SNR) ratio at the output, which is defined as the ratio of the total energy of the signal template divided by the noise variance:

$$SNR = \frac{1}{\sigma_n^2} \sum_{k=0}^{T} s_k^2.$$

If the proper lag, T, for sampling the output of the matched filter is known, then this statistic based upon the output of the MF can be compared with a threshold in order to detect in a probabilistic sense the presence or absence of an original signal, $s_k$.

Notwithstanding the advantages obtained with the matched filter, the underlying operations for processing signals with the filter tend not to adequately incorporate into a single functional measure both the time structure and the statistical distribution of time series or other sequential data corresponding to a signal sequence. Accordingly, there is a need for an enhanced matched filter that incorporates both signal aspects into a single functional measure.

SUMMARY OF THE INVENTION

The present invention provides a novel nonlinear signal processing framework based on a heretofore undefined function that incorporates both the time structure and the statistical distribution of signals. The framework provides a basis for extending the concept of the matched filter, resulting in devices and methods for enhanced matched filtering as described herein. The function so defined is termed a correntropy function, which is a generalization of the autocorrelation function. The correntropy function extends the conventional autocorrelation function to nonlinear spaces. The newly defined function also leads to a related measure termed a cross correntropy, which gives rise to a readily apparent relationship to information theoretic learning as described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
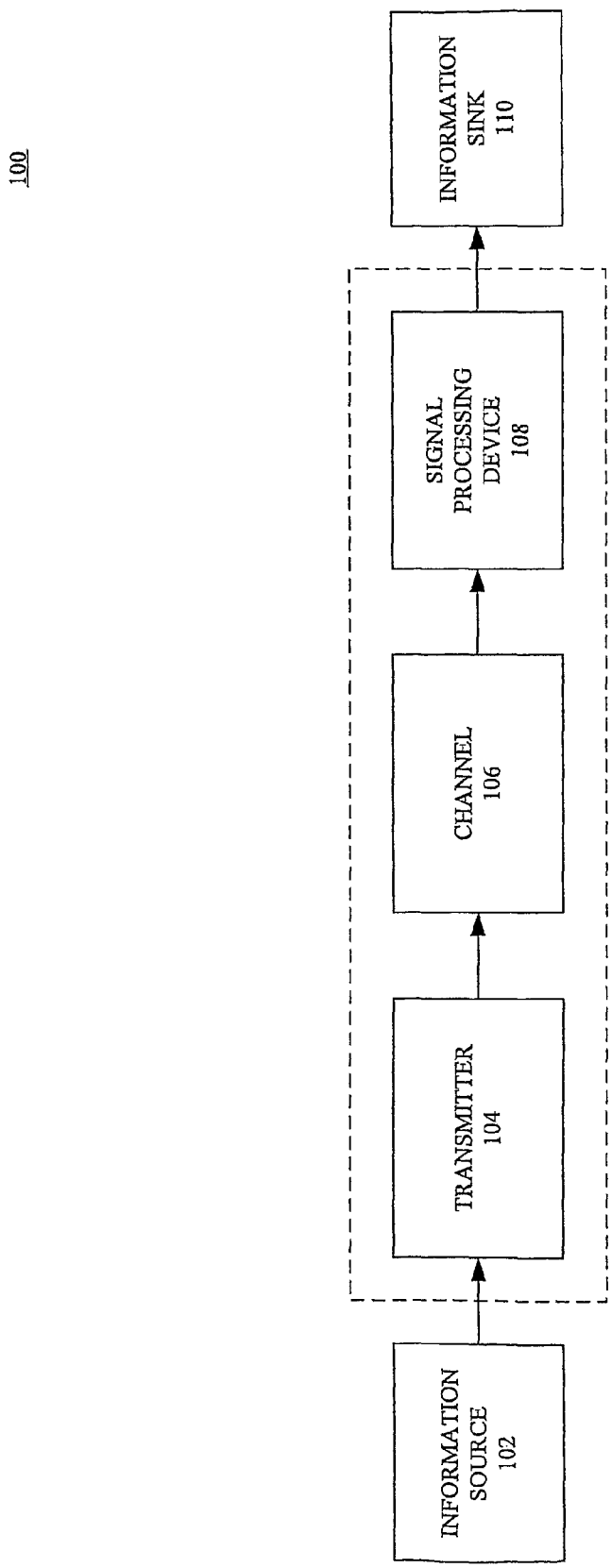
FIG. 1 is a schematic diagram of a communication system that includes a correntropy-based signal processing device, according to a particular embodiment of the invention.

Referring initially to FIG. 1, a communication system 100 having a correntropy-based signal processing device, according to one embodiment of the invention, is illustrated. The communication system 100 illustratively comprises an information source 102 that is communicatively linked to a signal transmitter 104. The information source 102 supplies information to the transmitter 104, which converts the information into one or more information-carrying signals. The signals are conveyed by the transmitter 104 over a channel 106 and received at a signal processing device 108, which converts the information-carrying signal into information data that is supplied to an information sink, or data user.

According to one embodiment, the communication system 100 is a digital communication system. The information supplied from the information source 102 is in the form of message signals. The message signals can be inherently digital—if, for example, the information source is a computer—or the message signals can be analog signals that must be converted into digital form with an analog-to-digital converter (not explicitly shown). The message signals are then modulated for transmission by the transmitter 104.

As will be readily understood by one of ordinary skill in the art, the modulation can be in accordance with different modulating techniques, such as pulse code modulation (PCM). Other known modulation techniques include amplitude-shift keying (ASK), phase-shift keying (PSK), and frequency-shift keying (FSK), depending on whether the amplitude, phase, or frequency, respectively, of the signal is modulated. A known modulation technique that is especially useful if bandwidth efficiency is a significant consideration is quadrature phase-shift keying (QPSK). Still other techniques include a technique related to QPSK termed offset QPSK (OQPSK) and minimum-shift keying (MSK), both of which will be readily understood by one of ordinary skill in the art.

In the context of the present embodiment, the signal processing device 108 is used in lieu of a conventional matched filter that might otherwise be employed with the communication system. The signal processing device 108 can thus function as a discrete receiver or as the receiving portion of a transceiver. It is to be understood throughout the ensuing discussion of the signal processing device 108, however, that the communication system 100 is only an illustrative environment in which the signal processing device can advantageously be employed. With little or no modification, the signal processing device 108 can be advantageously used in a host of other environments in which statistical-based signal processing is needed.

As will be apparent from the description herein of the signal processing device 108, the other environments in which the unique functions and capabilities provided by the signal processing device can advantageously be employed include the full range of wire-based and wireless communications devices (e.g., receivers and transceivers). Other environments include radar-based environments for effecting automatic target recognition of aircraft, land-based vehicles, and seagoing vessels. The signal processing device 108 described herein also has wide applicability in the context of biomedical technology, such as for performing signal processing functions relating to electrocardiograph and neural spike detection. Still another application is image processing based upon the correntropy function, as discussed more particularly below.

The signal processing device 108 effects signal detection based on a newly defined similarity function, correntropy. Correntropy is a function that provides a generalized correlation measure filling a void that has been a persistent limitation regarding conventional kernel methods and information theoretic learning. Correntropy fills this void, providing a function that incorporates both an underlying time structure and statistical distribution of a time series into the same functional measure. In one sense, therefore, the signal processing device 108 operates as an enhanced matched filter.

The correntropy function utilized by the signal processing device 108 generalizes the conventional autocorrelation function, thereby creating a function that applies to nonlinear spaces. In the context of random processes, the correntropy of a random process $x(t)$ at instances $t_1$ and $t_2$ is defined as follows:

$$V(t_1, t_2) = E(k(x_{t_1} - x_{t_2})),$$

where $E[.]$ is the known linear operator for determining the expected value of a function, and where k is a kernel function.

The kernel function k is here taken to be the Gaussian function:

$$k(x_1 - x_2) = \frac{1}{\sqrt{2\pi}\,\sigma} e^{-\left(\frac{x_1 - x_2}{\sqrt{2}\,\sigma}\right)^2}$$

The kernel transforms the input signal points $x_1$ and $x_2$ to the surface of a sphere of radius $$\frac{1}{\sigma\sqrt{2\pi}}$$

in kernal space. It will be readily appreciated by one of ordinary skill in the art, however, that any other translation invariant kernel obeying the Mercer conditions can similarly be used.

According to one embodiment, the kernel function is configured so as to be semi-positive definite. For example, the semi-positive definite kernel function can be a triangular shaped kernel. The triangular shaped kernel is particularly suited for implementation in digital signal processors.

The correntropy is a positive function that defines a new reproducing kernel Hilbert space for statistical signal processing. It estimates the cosine of the angle between two points on the sphere. Correntropy for stationary random processes can be estimated as $$\hat{V}(m) = \frac{1}{N-m} \sum_{i=1}^{N} k(x_i - x_{i-m}).$$

The same concept can be used to extend correntropy for two random processes. The new measure is defined herein as a cross correntropy. The cross correntropy is defined to be $V_{xy}(t_1,t_2)=E(k(x_{t_1}-y_{t_2}))$. Given that the two random processes are jointly stationary, this can be estimated as a function of lag, as follows:

$$\hat{V}_{xy}(m) = \frac{1}{N-m} \sum_{i=1}^{N} k(x_i - y_{i-m})$$

The relationship of this defined measure with information theoretic learning is apparent from the following. The mean of the cross correntropy estimate between independently distributed processes $x_k$ and $y_k$ over the lag is the functional correlation between the two probability density functions (pdfs), which is bounded by the information potentials of the two processes by the relationship, $$\langle \hat{V}_{xy}(m) \rangle_m = \int_{-\infty}^{\infty} P_x(z) P_y(z) \leq \sqrt{(\int_{-\infty}^{\infty} P_x^2(z)\,dz)(\int_{-\infty}^{\infty} P_y^2(z)\,dz)},$$

where $$\left( \int_{-\infty}^{\infty} P_x^2(z)\,dz \right)$$

is the information potential of the process $x_k$ and the pdf's $P_x$ and $P_y$ are estimated using Parzen windows.

For a zero lag, a similarity function between two signals, the template $s_k$ and the received signal $r_k$, can be defined accordingly. Thus a metric for the EMF is given by $$V = \frac{1}{N} \sum_{i=1}^{N} k(s_i - r_i)$$

Note, moreover, that for a match $$(r_k = s_k),\ V = \frac{1}{\sigma\sqrt{2\pi}}$$

For a signal template $s_k$ corrupted by additive white noise (AWN) $n_k$, the received signal is $r_k=s_k+n_k$ (linear channel). With respect to this detection problem, the two hypotheses and their corresponding similarity metric are tabulated in Table 1:

TABLE 1

Definition of the Hypotheses and Similarity values for detection

| Hypothesis | received signal | Similarity value |
|---|---|---|
| $H_0$ | $r_k = n_k$ | $V_0 = \frac{1}{N\sqrt{2\pi\sigma^2}} \sum_{i=1}^{N} e^{-(s_i-n_i)^2/2\sigma^2}$ |
| $H_1$ | $r_k = s_k + n_k$ | $V_1 = \frac{1}{N\sqrt{2\pi\sigma^2}} \sum_{i=1}^{N} e^{-n_i^2/2\sigma^2}$ |

For $V_1$, the following relationship defining boundaries of the statistic holds:

$$\frac{1}{\sigma\sqrt{2\pi}} e^{-\frac{1}{2\sigma^2 N} \sum_{i=1}^{N} n_i^2} \leq V_1 \leq \frac{1}{\sigma\sqrt{2\pi}}$$

The lower limit, derived using Jensen's inequality, is a critical value for the threshold, below which the matched filter gives one hundred percent detection probability. This value can be denoted critical threshold. It can be estimated from received data by estimating the associated noise power.

The value of V is proposed as the statistic to test the hypotheses of signal present or absent. Accordingly, V is denoted a correntropy statistic, the estimated value of which can be used to determine at a predetermined confidence level the likelihood that a received signal does or does not contain an information signal component embedded in the noise. Note that there is an extra parameter that is set by the user, namely the size of the Gaussian kernel, σ. The size of the optimal kernel σ can be determined using the dynamic range of the received signal.

The use of the correntropy statistic has been described primarily in terms of determining detecting information content in a signal. It is to be noted, however, that the techniques described herein can be extended to encompass detecting which among a plurality of signals is present. Specifically, multiple signal detection can be accomplished by evaluating the correntropy statistics with each of a plurality of possible signal templates. The signal corresponding to the greatest statistic is accordingly chosen as the likely signal.

Additionally, when timing information is unknown, the invention provides for asynchronous detection. As will be readily understood by one of ordinary skill in the art, a window of the signal template samples can be moved during a predefined time interval over different samples of a received signal. According to one embodiment of the invention, the correntropy metric, or statistic, is computed for each position of the window. The overall output is then threshold in a manner similar to that already described in the context of synchronous detection.

Figure 2:
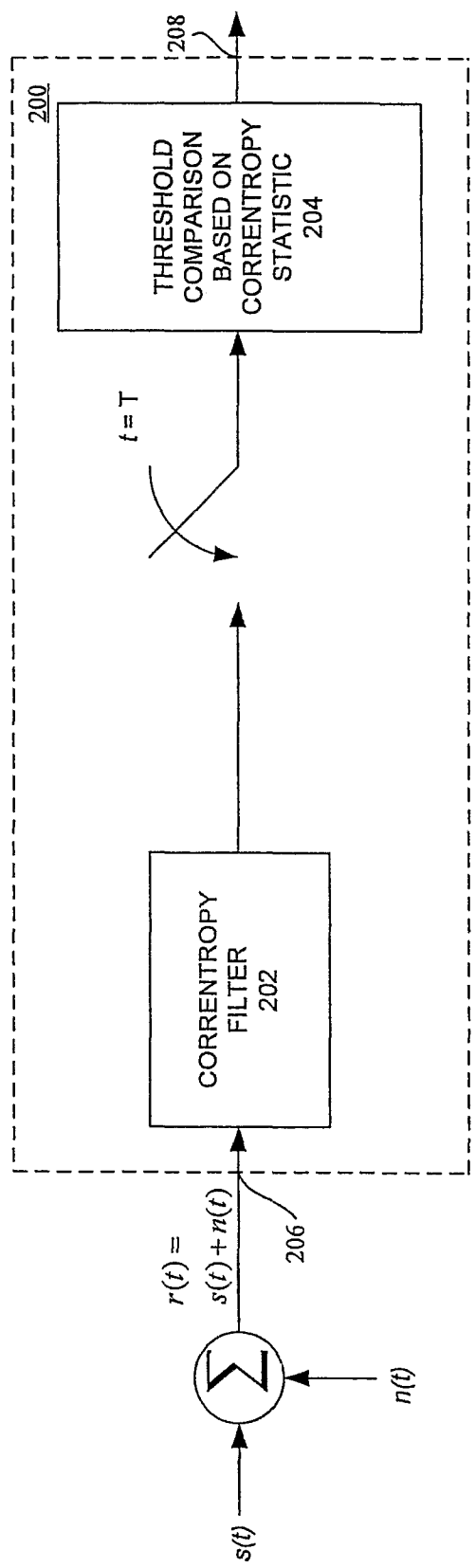
FIG. 2 is a schematic diagram of a correntropy-based signal processing device, according to a particular embodiment of the invention.

Referring now to FIG. 2, a signal processing device 200 according to the invention illustratively includes a filter 202, defining a correntropy filter, and a decision module 204 in communication with the filter. Although shown with only one filter 202, the signal processing device 200 alternatively can include more than one such filter. Operatively, the filter generates a signal response based upon a received signal. The signal response so generated comprises an estimated value of the correntropy statistic, defined above.

The correntropy statistic, in turn, is used by the decision module 204 to probabilistically decide whether or not the received signal contains an information signal component.

The decision is probabilistic in nature because there is the risk of two distinct types of error: deciding that the received signal does contain an information signal component when in fact it does not, and alternatively, deciding that the received signal does not contain an information signal component when in fact it does. In statistical parlance, this of course, these are the familiar type I and type II errors.

According to one embodiment, the estimated value of the correntropy statistic is determined by computing an expected value of a Mercer condition-satisfying kernel function, the kernel function having the received signal and a known transmitted signal template as arguments. More particularly, if the received signal and signal template are discrete values the estimated value of the correntropy statistic can be defined as $$V = \frac{1}{N}\sum_{i=1}^{N} k(s_i - r_i),$$

where k denotes the kernel function, $s_i$ denotes the i-th sample of the signal template, and $r_i$ denotes an i-th sample of the received signal, within a period [0, T].

According to yet another particular embodiment, the kernel function, k, is a Gaussian function. For the Gaussian function, given the argument values $s_i$ and $r_i$, the function takes on the value, $$k(s_i - r_i) = \frac{1}{\sqrt{2\pi}\,\sigma} \exp\left\{-\left[\frac{(s_i - r_i)}{\sqrt{2}\,\sigma}\right]^2\right\},$$

where σ is the size of the Gaussian kernel and 7the received signal $r_i$ and signal template $s_i$ are both zero mean.

The kernel function, according to still another embodiment, can be constructed to map a value of the argument to a surface of a sphere of radius $$\frac{1}{\sigma\sqrt{2\pi}}.$$

The decision module 204, as already noted probabilistically decides whether or not the received signal contains an information signal component based upon the estimated value of the correntropy statistic. According to one particular embodiment, the decision module 204 decides whether to accept or reject a null hypothesis. The null hypothesis, $H_0$, is that the received signal, $r_k$, comprises only a noise component $n_k$; that is, $H_0$: $r_k = n_k$, which yields a value of the correntropy statistic of $$V_0 = \frac{1}{N\sqrt{2\pi}\,\sigma}\sum_{i=1}^{N} \exp\left\{-\frac{(s_i - n_i)^2}{2\sigma^2}\right\}.$$

A corresponding alternative hypothesis, $H_1$, is that the received signal, $r_k$, comprises an information signal component $s_k$ as well as a noise component; that is $H_1$: $r_k = s_k + n_k$, which yields a value of the correntropy statistic of $$V_1 = \frac{1}{N\sqrt{2\pi}\,\sigma}\sum_{i=1}^{N} \exp\left\{-\frac{n_i^2}{2\sigma^2}\right\}.$$

According to yet another embodiment, the signal received by the signal processing device 200 comprises a noise component that is modeled by the filter 202 as a component having a Cauchy probability density function. It is emphasized that the filter 202 will also work for other probability density functions, including other alpha-stable distributions besides the Cauchy probability density function. Alternatively, the signal received by the signal processing device 200 comprises a noise component that is modeled by the filter 202 as having a Gaussian probability density function. The Gaussian probability density function is a finite-variance distribution, and thus, according to other embodiments, the noise component can be modeled by the filter as having any other finite-variance distribution.

The signal processing device 200, according to still another embodiment can comprise a receiver or a receiving portion of a transceiver for receiving a signal conveyed over a wire-based or wireless channel. The signal conveyed over the channel can be based on a signal template, as described above. The signal processing device 200 as a receiving device can further include an antenna or other signal input 206 for receiving a signal conveyed over the channel to the filter 202. The signal processing device also can include a signal output 208 connected to the decision module 204. A signal conveyed at the signal output 208 from the decision module 204 can indicate whether or not the received signal, as decided by the decision module, contains an information signal component, where the signal component corresponds to the known signal template. The signal output can go directly to a user or to another device such as a computer or related communications device.

Figure 3:
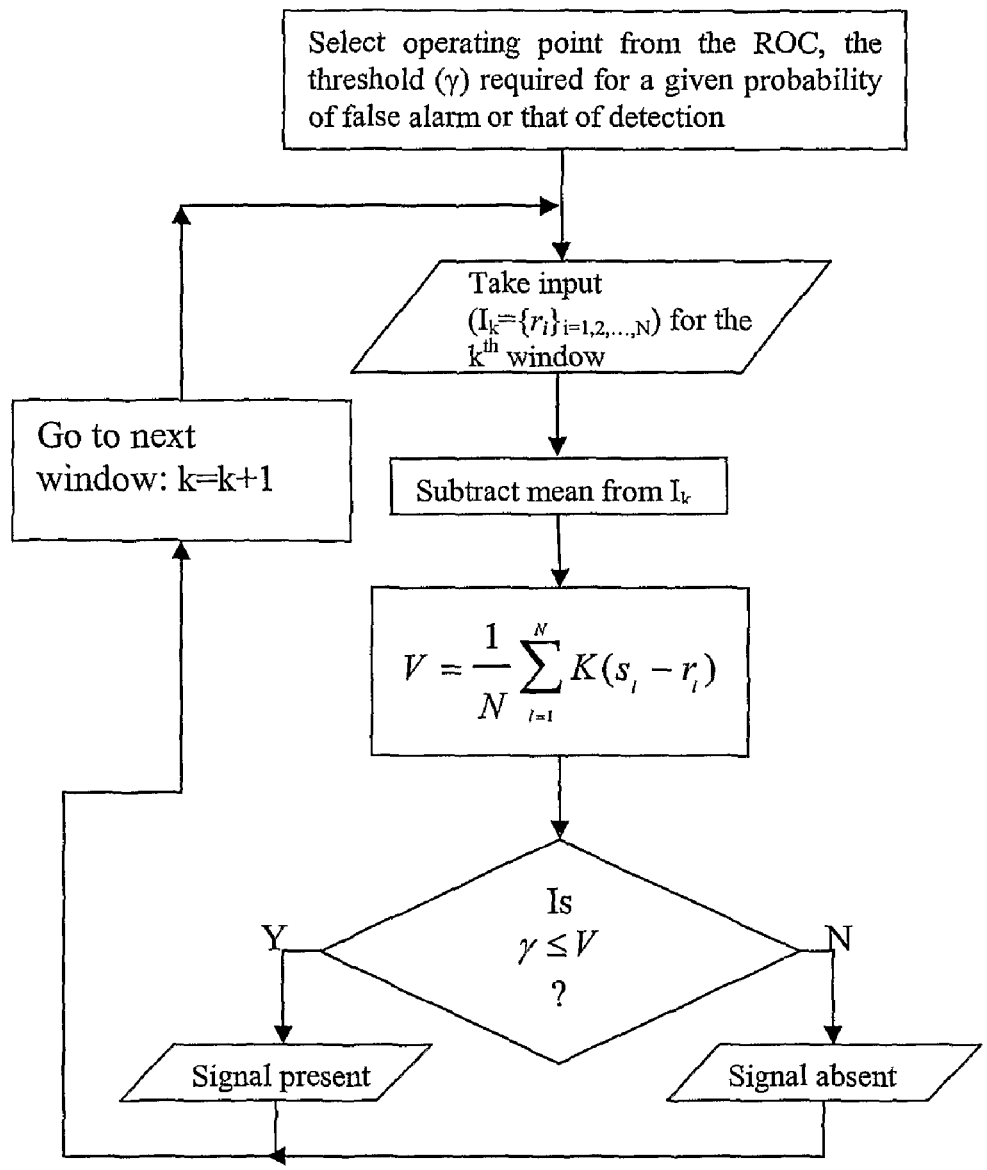
FIG. 3 is a flowchart of exemplary steps for effecting a method of determining whether a received signal contains an information component, according to another embodiment of the invention.

Referring now to FIG. 3, the exemplary steps of a method 300 of processing a noise-corrupted signal are illustratively shown. The method 300 illustratively begins at step 302. The method 300 continues at step 302 with the generation of a signal response to the noise-corrupted signal. The signal response specifically comprises an estimated value of a correntropy statistic. At step 304, a probabilistic decision is automatically made as to whether the received signal contains an information signal component based upon the estimated value of the correntropy statistic.

According to one embodiment, the estimated value of the correntropy statistic is determined by computing an expected value of a Mercer condition-satisfying translation invariant kernel function, the kernel function having the received signal and a known transmitted signal template as arguments. More particularly, the estimated value of the correntropy statistic can be computed according to the following equation $$V = \frac{1}{N}\sum_{i=1}^{N} k(s_i - r_i),$$

where k denotes the kernel function, $s_i$ denotes the i-th sample of the signal template, and $r_i$ denotes an i-th sample of the received signal in the period [0, T].

According to one embodiment of the method 300, the kernel function, k, is a Gaussian function, which, for an argument x, takes on the value $$k(x) = \frac{1}{\sqrt{2\pi}\,\sigma} \exp\left\{-\left[\frac{(x-\bar{x})}{\sqrt{2}\,\sigma}\right]^2\right\},$$

where $\bar{x}$ and $\sigma$ comprise a mean and standard deviation of a plurality of values for the argument x. The kernel function, moreover, can be constructed to map a value of the argument to a surface of a sphere of radius $$\frac{1}{\sigma\sqrt{2\pi}}.$$

Any other function that is positive definite, or positive semi-definite, and translation invariant can be used instead of the Gaussian function.

According to still another embodiment of the method 300, probabilistically deciding whether the received signal contains an information signal component comprises deciding whether to accept or reject a null hypothesis. The null hypothesis, $H_0$, is that the received signal $r_k$ comprises only a noise component $n_k$, $H_0$: $r_k = n_k$, yielding a value of the correntropy statistic of $$V_0 = \frac{1}{N\sqrt{2\pi}\,\sigma} \sum_{i=1}^{N} \exp\left\{-\frac{(s_i - n_i)^2}{2\sigma^2}\right\},$$

and a corresponding alternative hypothesis, $H_1$, is that the received signal $r_k$ comprises an information signal component $s_k$ and as well as a noise component, $H_1$: $r_k = s_k + n_k$ yielding a value of the correntropy statistic of $$V_1 = \frac{1}{N\sqrt{2\pi}\,\sigma} \sum_{i=1}^{N} \exp\left\{-\frac{n_i^2}{2\sigma^2}\right\}.$$

Any other positive definite or positive semi-definite, and translation invariant function can be used instead of the Gaussian function.

EXAMPLES

Monte-Carlo (MC) simulations are performed to obtain several values of 'V' which are then used to generate receiver operating characteristic (ROC) curves that plot the probability of false alarm ($P_{fa}$) against the probability of detection ($P_d$), using a sequence of different threshold values (the highest threshold gives the value at 0,0). The ROC curves are plotted for different signal-to-noise (SNR) ratios defined in (eq. 2) for the proposed extended matched filter (EMF) and the linear matched filter (MF).

Figure 4:
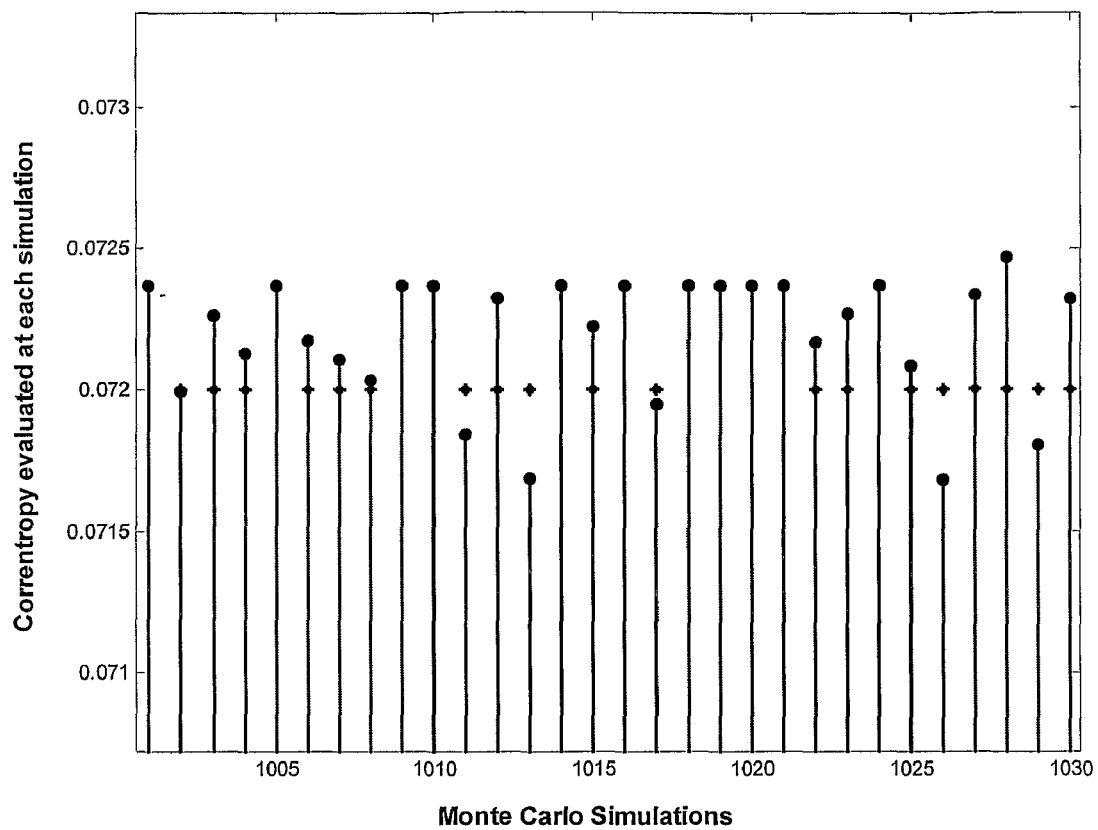
FIG. 4 is a plot of correntropy outputs based on Monte Carlo simulations of an embodiment of the invention.

Both linear and nonlinear channels in the presence of two additive noise distributions namely Cauchy and Gaussian distributions will be simulated to provide an evaluation of the performance of the new matched filer based on correntropy. The probability of transmitting a signal is set at 0.5. Segments (chips) of length equal to the signal, some containing the signal and others without the signal, were generated with the MC procedure Linear Channel FIG. 4 shows the output of the V statistics for chips that have the signal (no cross) and also for noisy chips. Notice that the signal chips have basically all the same value as predicted by our analysis. Most of the noise chips are clearly lower than the signal, but notice that simulation 1028 provides a value ABOVE the signal chips, so it can immediately be eliminated.

Figure 5:
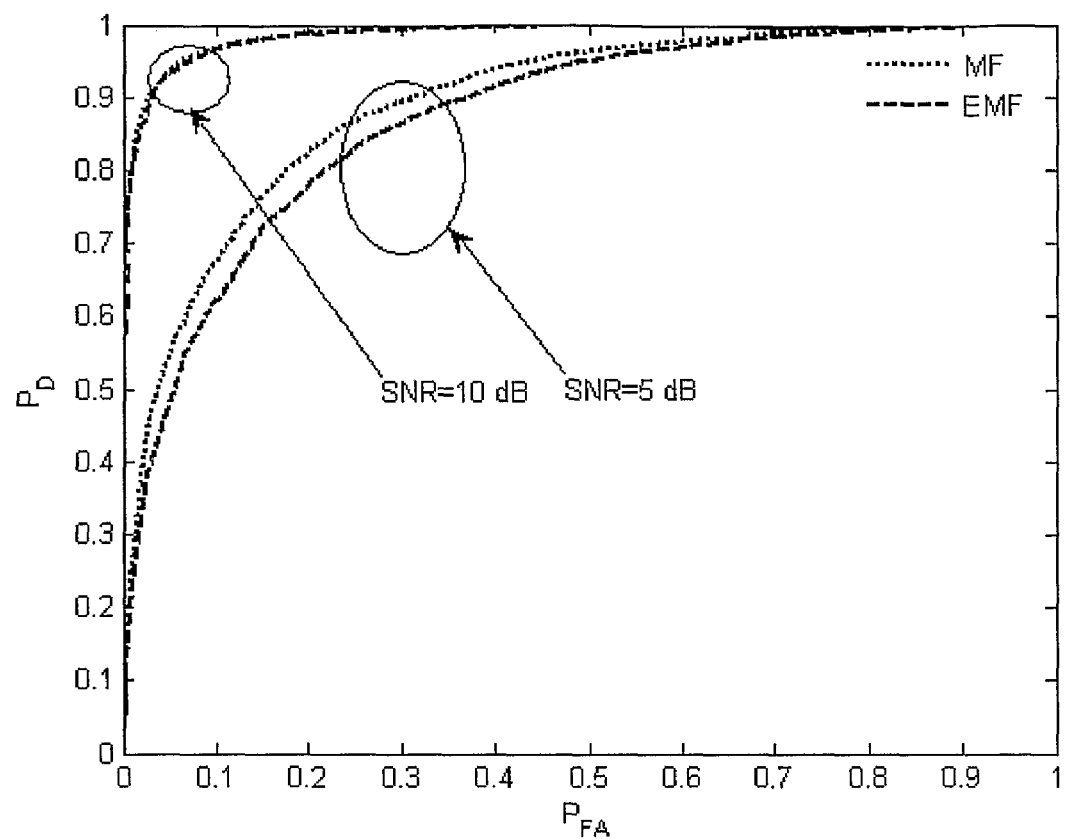
FIG. 5 provides a series receiver operating characteristic (ROC) curves for a linear channel transmitting a sinusoidal signal corrupted by additive white Gaussian noise (AWGN) based on simulations contrasting performances of conventional matched filters with performances of devices that are embodiments of the present invention.

For the linear channel ($r_k = s_k + n_k$) the transmitted signal is sinusoidal in shape ($s = \sin(0.2\pi n)$ where $n = 0, \ldots, 15$) with a period of 16 samples. The ROCs when the signal is corrupted by Gaussian additive noise for signal-to-noise (SNR) ratios of 5 dB and 10 dB are shown in FIG. 5. As can be observed, the EMF performs similarly to the MF even when the MF is known to be optimal.

Figure 6:
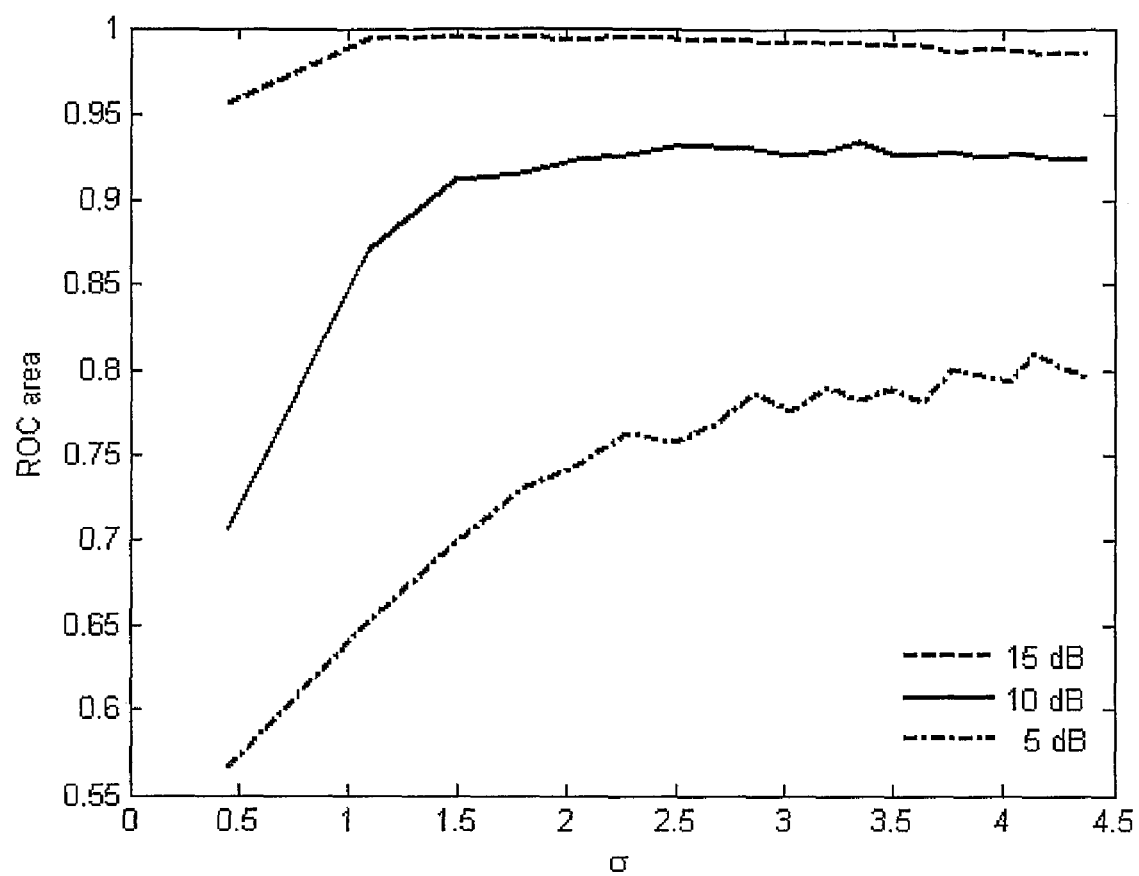
FIG. 6 provides a plot of the area under the ROC curve as a function of the kernel size for three different SNR.

In all the experiments involving the EMF, the size of the kernel needs to be chosen optimally. FIG. 6 depicts the area under the ROC which is an indicator of the quality of the detector, for different values of the kernel size $\sigma$. One can conclude that there is a large range of kernel sizes for which the performance of the detector is basically unchanged. This simplifies the selection in practical cases and show that Silverman's rule of density estimation is applicable.

Figure 7:
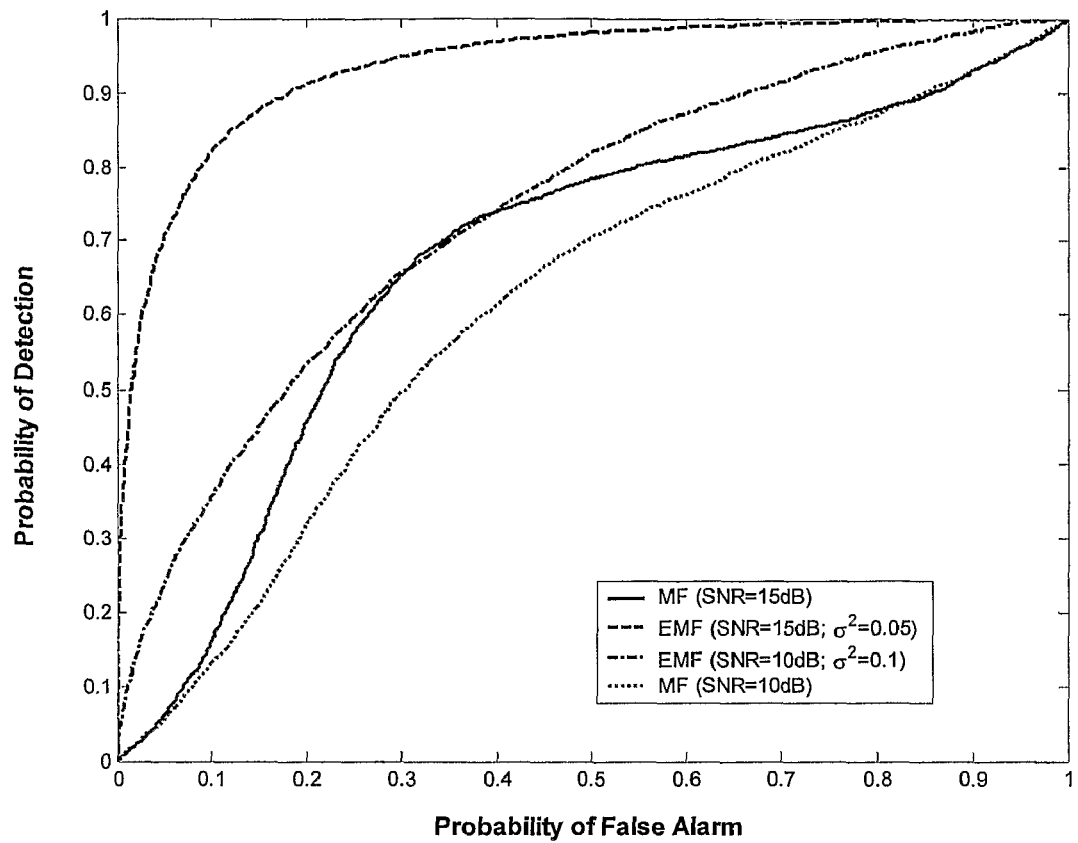
FIG. 7 provides a series of receiver operating characteristic (ROC) curves for a linear channel transmitting a binary signal corrupted by additive white Cauchy noise based on simulations contrasting performances of conventional matched filters with performances of devices that are embodiments of the present invention.

The same sinusoidal signal is then corrupted by an impulsive additive noise which is Cauchy distributed and the corresponding ROC is shown in FIG. 7. The plots are presented for SNR values of 10 and 15 dB. The EMF clearly outperforms the MF in both the cases and the results were again found to be invariant with the signal type (and are hence not presented), although the improvement in performance is found to be a function of the SNR value. At SNR values less than 10 dB, the MF was found to perform better than the EMF. Notice that for Cauchy noise there is no region where the MF is better than the EMF, so only the EMF shall be used.

Nonlinear Channels

For nonlinear channels ($r_k = f(s_k + n_k)$) the Exponential transmitted signal corrupted by Gaussian distributed additive white noise is passed through the following nonlinearities:

The nonlinearity is a sigmoid $$\left(f(x) = \frac{1}{\exp(-10(x - 0.3))}\right)$$

function.

The nonlinearity is a sinusoidal ($f(x) = \sin(2\pi x)$) function.

Figure 8:
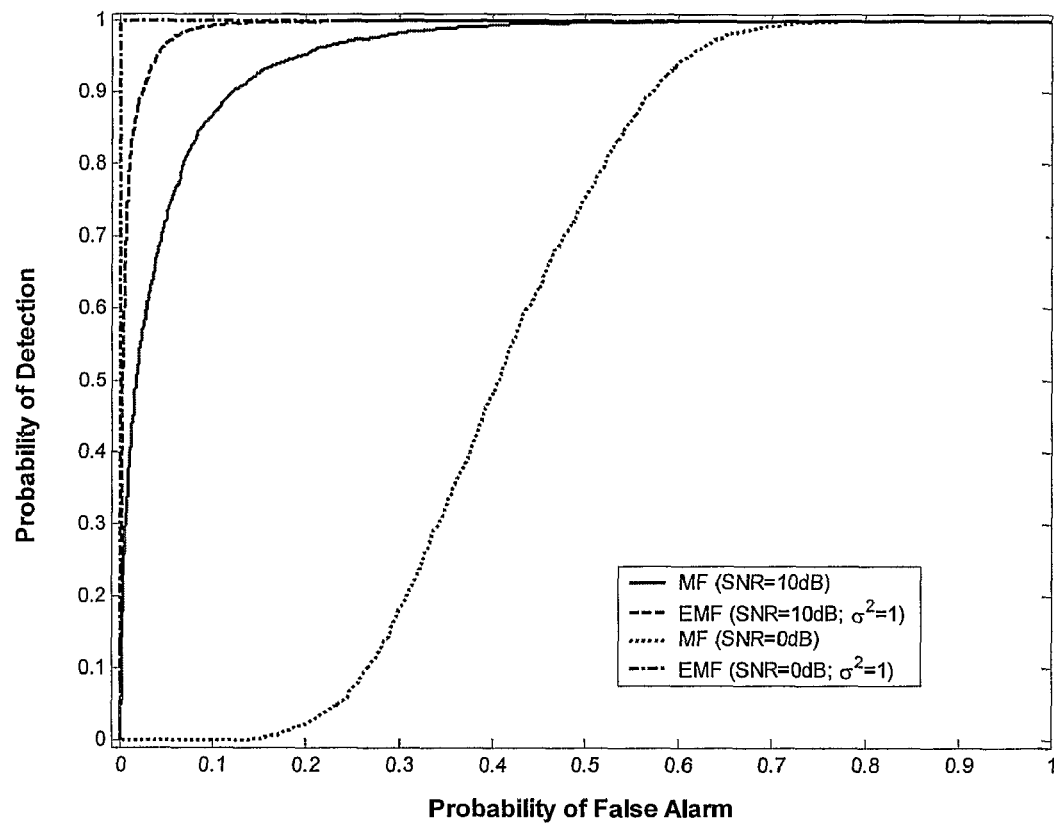
FIG. 8 provides a series of receiver operating characteristic (ROC) curves for a sigmoidal nonlinear channel transmitting an exponential signal corrupted by additive white Gaussian noise (AWGN) based on simulations contrasting performances of conventional matched filters with performances of devices that are embodiments of the present invention.
Figure 9:
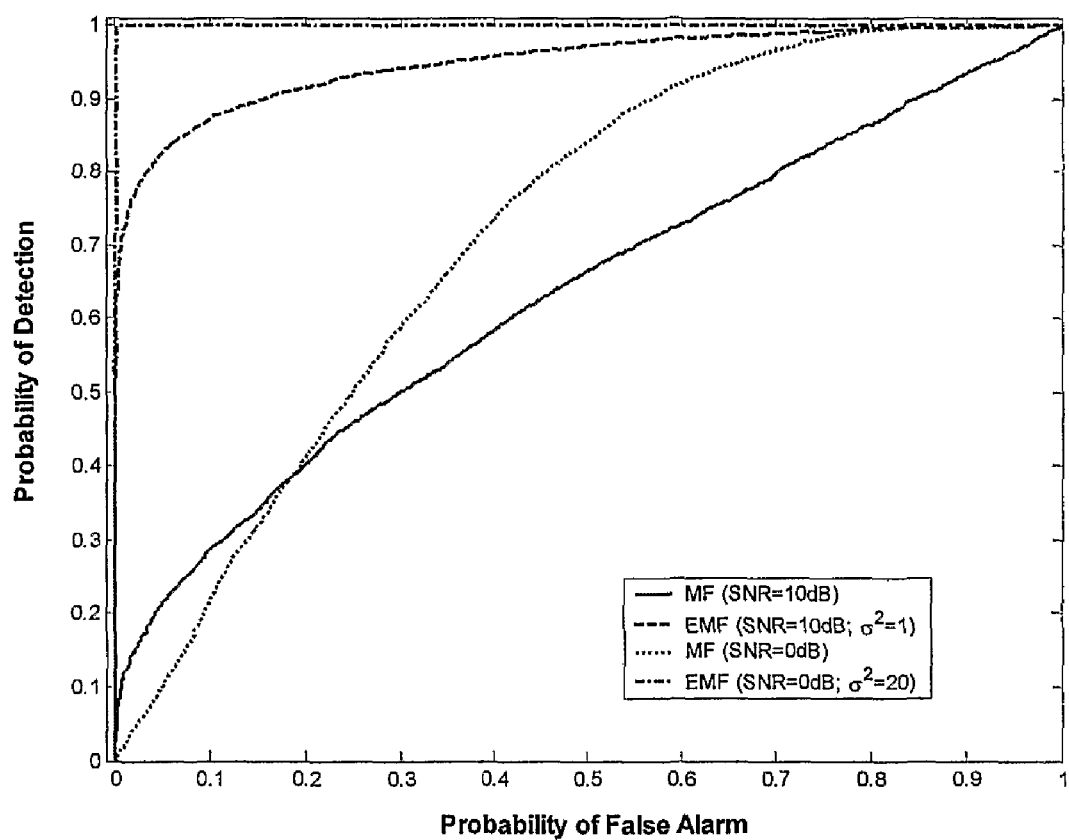
FIG. 9 provides a series of receiver operating characteristic (ROC) curves for a sinusoidal nonlinear channel transmitting an exponential signal corrupted by additive white Gaussian noise (AWGN) based on simulations contrasting performances of conventional matched filters with performances of devices that are embodiments of the present invention.

The SNR for this scenario has been defined at the transmission end (before the channel nonlinearity) as given by (2), for ease of computation and understanding. The ROC plots for the given nonlinearities are shown in FIGS. 8-9 at two input SNR values of 0 dB and 10 dB. In this case the critical threshold has no meaning since there may be distortions between the received signal and the template. At low SNR values, the EMF performance is found to surpass that of the MF, but the distinction reduces with increasing input SNR as expected (detection gets simpler). The mean of the received signal has to be estimated and subtracted before we estimate V, in the case of the nonlinear channel.

Clearly, the matched filter being based on second order statistics alone, has shortcomings when nonlinear distortions are introduced by the channel. The new matched filter is less prone to these kinds of distortions. The traditional matched filter is computationally simple, and our enhanced matched filter has the same complexity O(N).

Correntropy Matched Filters for Images

The invention can be extended to images, in which event the techniques employed can be characterized as including synthetic discriminant functions. A salient feature of the MACE (minimum average correlation energy) formulation is that it is a multidimensional matched filter for which an analytic solution can still be computed directly from the data, so training is minimized. The spatial matched filter can be formulated as follows:

$$\min h^T h \text{ subject to } x^T h = d$$

which yields the solution $h = x(x^T x)^{-1} d$. The underlying idea is to consider an image of an object as a vector of measurements x, and to construct the template matcher h that represents the object and obeys the conditions through optimization. This result is optimum for a single view of the object. So the problem is how to create a single h for the class of all rotated versions of the object. The following approach has been proposed:

$$\min h^T h \text{ subject to } X^T h = d$$

which yields the solution $h = X(X^T X)^{-1} d$, where X is now a matrix of all the relevant views of the object. The columns of X are the exemplars, and the rows are the measurement responses (vectorized image). d now becomes a vector of desired responses, one for each input vector. This solution is possible due to the large number of parameters in X. For white noise background, this filter is optimal. However, for most real world images this will not be the case due to the high correlation among the backgrounds. Therefore, a minimum variance synthetic discriminate function has been proposed:

$$\min h^T \Sigma h \text{ subject to } X^T h = d$$

which yields the solution $h = \Sigma^{-1} X(X^T \Sigma^{-1} X)^{-1} d$, where $\Sigma$ is a matrix of weights that minimize the responses to unwanted samples. The analytical solution is in general complicated. Moreover, and when the problem is formulated in the frequency domain for diagonal matrix, it is referred to as the MACE filter.

$$\min H^\dagger D H \text{ subject to } X^\dagger H = d$$

which yields the solution $H = D^{-1} X(X^\dagger D^{-1} X)^{-1} d$, where $\dagger$ is the complex conjugate transposed, and D is a 2D diagonal matrix that contains the average power spectrum of the templates.

The previous optimization problem can be solved in a higher dimensional kernel feature space by transforming each element of the matrix of exemplars X to $\phi(X_{ij})$, thus forming a higher dimensional matrix $\Phi_X$ whose $ij^{th}$ feature vector is $\phi(X_{ij})$. The filter in feature space will be denoted as $f_h$. If M×N is the dimension of X, that of $\Phi_X$ is ∞×N. So, the above optimization problem can be written:

$$\min f_h^T V_X f_h \text{ subject to } \Phi_X^T f_h = d$$

which yields the solution, $f_h = V_X^{-1} \Phi_X (\Phi_X^T V_X^{-1} \Phi_X)^{-1} d$ where d is an N×1 vector and $V_X$ is the N×N full rank correntropy matrix whose each element is given by:

$$(V_{xx})_{ij} = \sum_{k=1}^{M} k(x_{ki}, x_{kj}), \ i, j = 1, 2, \ldots, N$$

Though $\Phi_h$ is a higher dimensional vector, the output of this filter is going to be an N×1 vector which can be easily computed using these kernels. If Z is the test images, the out put vector y is given by, $$y = \Phi_Z^T V_X^{-1} \Phi_X (\Phi_X^T V_X^{-1} \Phi_X)^{-1} d$$

where $\Phi_Z$ is the projected test image matrix and $V_{XX}$ are N×N, and d is N×1. Thus to get the final output, a finite amount of computation must be tolerated.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. Another alternative is an application specific digital signal processor gate arrays (FPGA) tailored to the application.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:
1. A signal processing device, comprising:
   a signal input for receiving a signal conveyed over a channel, the signal defining a received signal;
   a decision module configured to probabilistically determine whether the received signal contains a known signal component based upon a correntropy statistic, wherein the correntropy statistic is estimated by a sum of kernel evaluations of a difference between a known signal template and the received signal; and
   a signal output for conveying a signal that indicates the presence of the known signal when the correntropy statistic is above a predetermined threshold.

2. The signal processing device as defined in claim 1, wherein an estimated value of the correntropy statistic is determined by computing an expected value of a Mercer kernel function, the kernel function having the received signal and the known signal template as arguments.

3. The signal processing device as defined in claim 2, wherein the estimated value of the correntropy statistic is defined by the equation $$V = \frac{1}{N} \sum_{i=1}^{N} k(s_i - r_i),$$

k denoting the kernel function, $s_i$ denoting an i-th sample of the known signal, and $r_i$ denoting an i-th sample of the received signal.

4. The signal processing device as defined in claim 3, wherein the kernel function is semi positive definite.

5. The signal processing device as defined in claim 2, wherein the kernel function, k, is a Gaussian function, which, for an argument x, takes on the value $$k(x) = \frac{1}{\sqrt{2\pi}\,\sigma} \exp\left\{-\left[\frac{(x-\bar{x})}{\sqrt{2}\,\sigma}\right]^2\right\},$$

where $\bar{x}$ and $\sigma$ comprise a mean and standard deviation of a plurality of values for the argument x.

6. The signal processing device as defined in claim 5, wherein the decision module generates a decision indicating whether or not the received signal contains an expected signal component, the decision corresponding to deciding whether to accept or reject a null hypothesis wherein the null hypothesis $H_0$ is that the received signal $r_k$ comprises only a noise component $n_k$, $H_0$: $r_k=n_k$, yielding a value of the correntropy statistic of $$V_0 = \frac{1}{N\sqrt{2\pi}\,\sigma}\sum_{i=1}^{N}\exp\left\{-\frac{(s_i-n_i)^2}{2\sigma^2}\right\},$$

and a corresponding alternative hypothesis $H_1$ is that the received signal $r_k$ comprises the expected signal component $s_k$ and a noise component, $H_1$: $r_k=s_k+n_k$, yielding a value of the correntropy statistic of $$V_1 = \frac{1}{N\sqrt{2\pi}\,\sigma}\sum_{i=1}^{N}\exp\left\{-\frac{n_i^2}{2\sigma^2}\right\}.$$

7. The signal processing device as defined in claim 1, wherein the signal processing device comprises a wireless communications device further comprising a receiving antenna for receiving the received signal, the channel over which the received signal is conveyed being a wireless channel and the received signal comprising a wireless signal.

8. The signal processing device as defined in claim 1, wherein the received signal comprises a noise component that is modeled as having an alpha-stable distribution.

9. The signal processing device as defined in claim 1, wherein the received signal comprises a noise component that is modeled as having a finite-variance distribution.

10. A method of recognizing a known signal in a noise-corrupted signal, the method comprising:
 continuously subtracting in time samples of the known signal from the samples of the noise-corrupted signal to generate a difference signal and applying a correntropy statistic to the difference signal, where the correntropy statistic is estimated by kernel evaluations on the difference signal;
 probabilistically deciding whether the received signal contains the known signal by comparing the correntropy statistic to a predetermined threshold.

11. The method as defined in claim 10, wherein the kernel evaluation is determined by computing an expected value of a Mercer kernel function, the kernel function having the noise-corrupted signal and the known signal template as arguments.

12. The method as defined in claim 11, wherein the estimated value of the correntropy statistic is defined by the equation $$V = \frac{1}{N}\sum_{i=1}^{N} k(s_i - r_i),$$

k denoting the kernel function, $s_i$ denoting an i-th sample of the known signal template, and $r_i$ denoting an i-th sample of the noise-corrupted signal.

13. The method as defined in claim 11, wherein the kernel function, k, is a Gaussian function, which, for an argument x, takes on the value $$k(x) = \frac{1}{\sqrt{2\pi}\,\sigma} \exp\left\{-\left[\frac{(x-\bar{x})}{\sqrt{2}\,\sigma}\right]^2\right\},$$

where $\bar{x}$ and $\sigma$ comprise a mean and standard deviation of a plurality of values for the argument x.

14. The method of claim 13, wherein the kernel function is semi positive definite.

15. The method as defined in claim 13, wherein the decision of whether the received signal contains the known signal is based upon whether to accept or reject a null hypothesis wherein the null hypothesis $H_0$ is that the received signal $r_k$ comprises only a noise component $n_k$, $H_0$: $r_k=n_k$, yielding a value of the correntropy statistic of $$V_0 = \frac{1}{N\sqrt{2\pi}\,\sigma}\sum_{i=1}^{N}\exp\left\{-\frac{(s_i-n_i)^2}{2\sigma^2}\right\},$$

and a corresponding alternative hypothesis $H_1$ is that the received signal $r_k$ comprises an information signal component $s_k$ and a noise component, $H_1$: $r_k=s_k+n_k$, yielding a value of the correntropy statistic of $$V_1 = \frac{1}{N\sqrt{2\pi}\,\sigma}\sum_{i=1}^{N}\exp\left\{-\frac{n_i^2}{2\sigma^2}\right\}.$$

16. The method as defined in claim 10, further comprising modeling a noise component of the noise-corrupted signal based on an alpha-stable distribution.

17. The method as defined in claim 10, further comprising modeling a noise component of the noise-corrupted signal based on a finite-variance distribution.

18. An image processing device, comprising:
 an input for receiving an image conveyed over a channel, the image defining a received image;
 a decision module configured to probabilistically determine whether the received image contains a known object component based upon an estimated value of the correntropy statistic, the correntropy statistic based at least upon a kernel evaluation of a difference between a known image template and the received image, the determination being based at least upon a comparison between the correntropy statistic and a predetermined threshold; and a signal output that indicates the received image corresponds to the known image template if the decision module determines that the received image contains the object under search.

19. The signal processing device as defined in claim 18, wherein the kernel evaluation is determined by computing an expected value of a Mercer kernel function, the kernel function having the received image and the known image template as arguments.

20. The signal processing device as defined in claim 19, wherein the estimated value of the correntropy statistic is defined by the equation, $$V_X = \frac{1}{N}\sum_{i=1}^{N} V_{xi},$$

k denoting the kernel function, $V_{xi}$ denoting a matrix with $(j,k)^{th}$ element $(j, k=1, 2, \ldots, d)$ given by $$v_{xi}(i, j) = \sum_{n=1}^{d} k(x_i(n), x_i(n + |j - k|))$$

which is the correntropy between the image pixels of the $i^{th}$ template image, d is the length of the $i^{th}$ template image vector and N is the number of image templates.

21. The signal processing device as defined in claim 19, wherein the kernel function, k, is a Gaussian function, which, for a test image Z computes the statistic $y = \Phi_Z^T V_X^{-1} \Phi_X (\Phi_{X-}^T V_X^{-1} \Phi_X)^{-1} d^-$ where $\Phi_x$ and $\Phi_Z$ are the Fourier transformed template and test images, $V_X^{-1}$ is the inverse of the correntropy matrix, and d is a constant vector.

22. The signal processing device as defined in claim 21, wherein the kernel function is semi positive definite.

* * * * *